Figure 1:
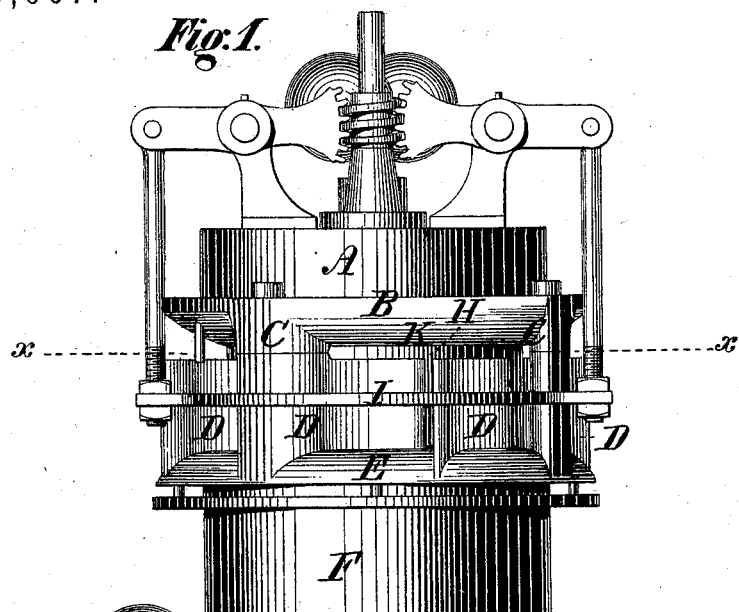

2 Sheets--Sheet 1.

T. H. RISDON & W. W. TYLER.
Casings for Turbine-Wheels.

No. 149,607. Patented April 14, 1874.

Witnesses.
J. Snowden Bell.
J. Bonsall Taylor.

Inventors.
Theodore H. Risdon,
William W. Tyler,
by their Atty,
Horace Binney, 3rd.

2 Sheets--Sheet 2.

T. H. RISDON & W. W. TYLER.
Casings for Turbine-Wheels.

No.149,607. Patented April 14, 1874.

Witnesses.
J. Snowden Bell
J. Bonsall Taylor

Inventors.
Theodore H. Risdon,
William W. Tyler,
by their Atty,
Horace Binney, 3rd

UNITED STATES PATENT OFFICE.

THEODORE H. RISDON AND WILLIAM W. TYLER, OF MOUNT HOLLY, N. J.

IMPROVEMENT IN CASINGS FOR TURBINE-WHEELS.

Specification forming part of Letters Patent No. 149,607, dated April 14, 1874; application filed January 31, 1874.

CASE A.

*To all whom it may concern:*

Be it known that we, THEODORE H. RISDON and WILLIAM W. TYLER, both of Mount Holly, in the county of Burlington and State of New Jersey, have invented a new and useful Improved Casing for Turbine-Wheels; and we do hereby declare the following to be a full, clear, and exact description thereof, which will enable others skilled in the art to which it appertains to make and use our said invention, reference being had to the accompanying drawing which forms a part of this specification.

This invention relates to the casing of turbine-wheels to which the water is admitted horizontally, or nearly so, by means of a flanged annular gate, (commonly known as a cylinder-gate,) and from which the discharge is in a vertical, or nearly vertical, direction. Its object is to prevent the lodgment of obstructions between the flange of such gate and the part of the casing toward which said flange moves when the gate is opening; and to this end it consists in so constructing the seats by which the upper and lower portions of the casing are connected, that they are out of contact with the gate; and also in so constructing the curved guides, which direct the water to the wheel, that they do not extend to the surface of the plate to which said seats are attached, thus leaving a clear space all round the casing between said surface and the gate-flange, and dispensing with angles in which obstructions might lodge and clog the movement of the gate or prevent its full opening. This invention is applicable both to upwardly-opening cylinder-gates and to those which open downwardly.

The four figures on the first sheet of the drawing represent the invention as applied to an upwardly-opening gate.

Figure 2:
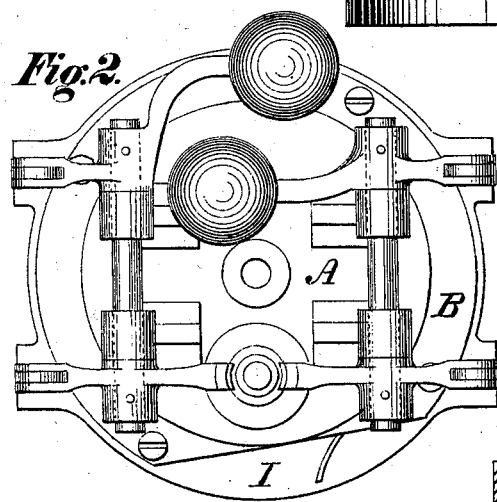
Figure 3:
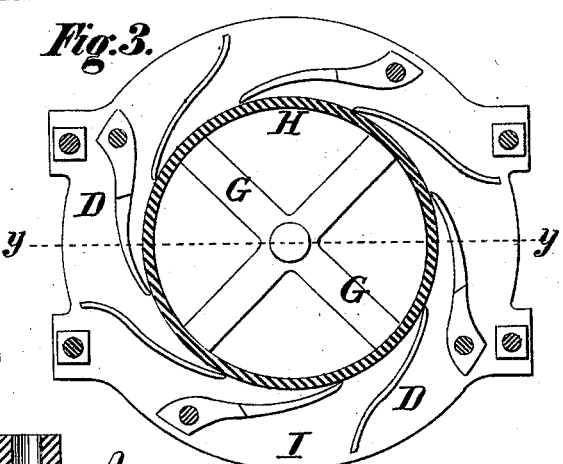
Figure 4:
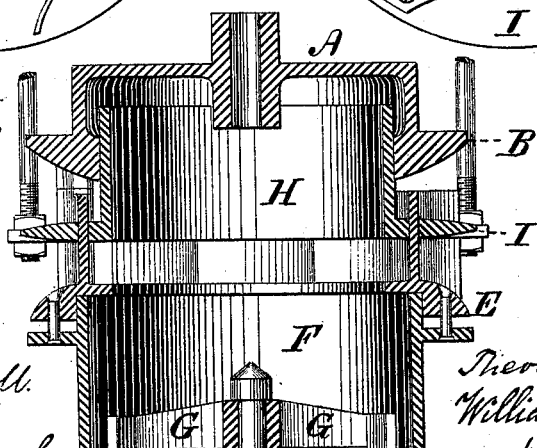

Figure 1 is an elevation; Fig. 2, a plan; Fig. 3, a section taken on the line *x x*, Fig. 1; Fig. 4, a section on the line *y y*, Fig. 3; and Fig. 5, Sheet 2, represents the invention as applied to a downwardly-opening gate.

The same parts are denoted by the same letters in all the figures.

Figure 5:
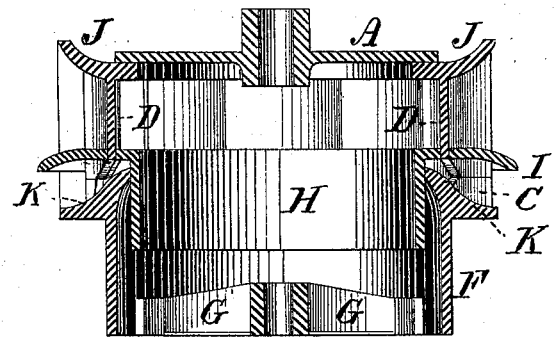

A represents the crown-plate which covers the wheel. This plate is made with a flange, B, from which project four (or any convenient number of) seats, C, each of which is bolted to one of the curved guides D. The annular plate E, on which said guides are cast, rests on the draft-tube F, and its flange is bolted to the flange on said tube. To the lower end of the draft-tube is attached a bridge-tree, consisting of any suitable number of arms, G G, radiating from a central hub which incloses and supports a stud or pin whose upper end forms the bearing of the vertical shaft of the turbine-wheel. H is a vertically-movable annular gate, made with a flange, I, in which are curved slots conformed to the shape of the guides D, so as to permit the gate to move freely up and down, the guides projecting through the slots. To facilitate the entrance of the water, the surfaces of the gate-flange and opposite plate, between which it enters, may be curved, as shown in Figs. 4 and 5 of the drawing. In order to prevent obstructions from lodging between the gate-flange and that part of the casing toward which it moves in opening, we leave a clear space between that surface of said flange which is away from the entering water, and the surface K of the adjacent flange of the casing. This space is obtained by so forming or cutting away the inner side of the seats C that they do not extend to the gate, and by making the guides D shorter than the distance between the flanges of the crown-plate and draft-tube, so that they do not extend to the surface K. The shedding of obstructions is also facilitated by curving the surface K, as shown in Figs. 1, 4, and 5, and by cutting away the flange B between the seats C, as shown on the lower side of Fig. 2. In Fig. 5 the crown-plate rests on a rim-plate, J, on which the guides D are cast. The seats C, each of which forms the support for one of said guides, are cast on the flange of the draft-tube F. The seats and guides are constructed as above described, so as to leave a clear space between the upper surface K of this flange and the gate-flange I. If the flange I comes close to the surface K when the gate is fully open, as shown in the figure, the inner sides of the seats, as well as the lower ends of the guides, may be beveled or cut away, as shown.

The seats C may, if desired, be dispensed with, and the plate A or J be supported by standards resting on the draft-tube or plate which rests thereon. These standards will be outside of the guides and entirely out of contact with the gate.

Our invention is applicable to a double-cylinder gate, i. e., one in which an outer ring or hollow cylinder is attached to flange I parallel to the ring H, so as to form an annular trough.

What we claim as our invention, and desire to secure by Letters Patent of the United States, is—

The seats C (or standards) and guides D, so constructed and arranged with reference to the flanged gate and the surface K, toward which said gate moves in opening, as to leave a space between said surface and the flange I for the escape of obstructions, substantially as shown and described.

THEODORE H. RISDON.
WILLIAM W. TYLER.

Witnesses:
ELSWORTH HOLEMAN,
RICHARD P. HOLEMAN.